No. 822,620.   PATENTED JUNE 5, 1906.
F. P. MAYO.
PILE DRIVER.
APPLICATION FILED APR. 18, 1904.

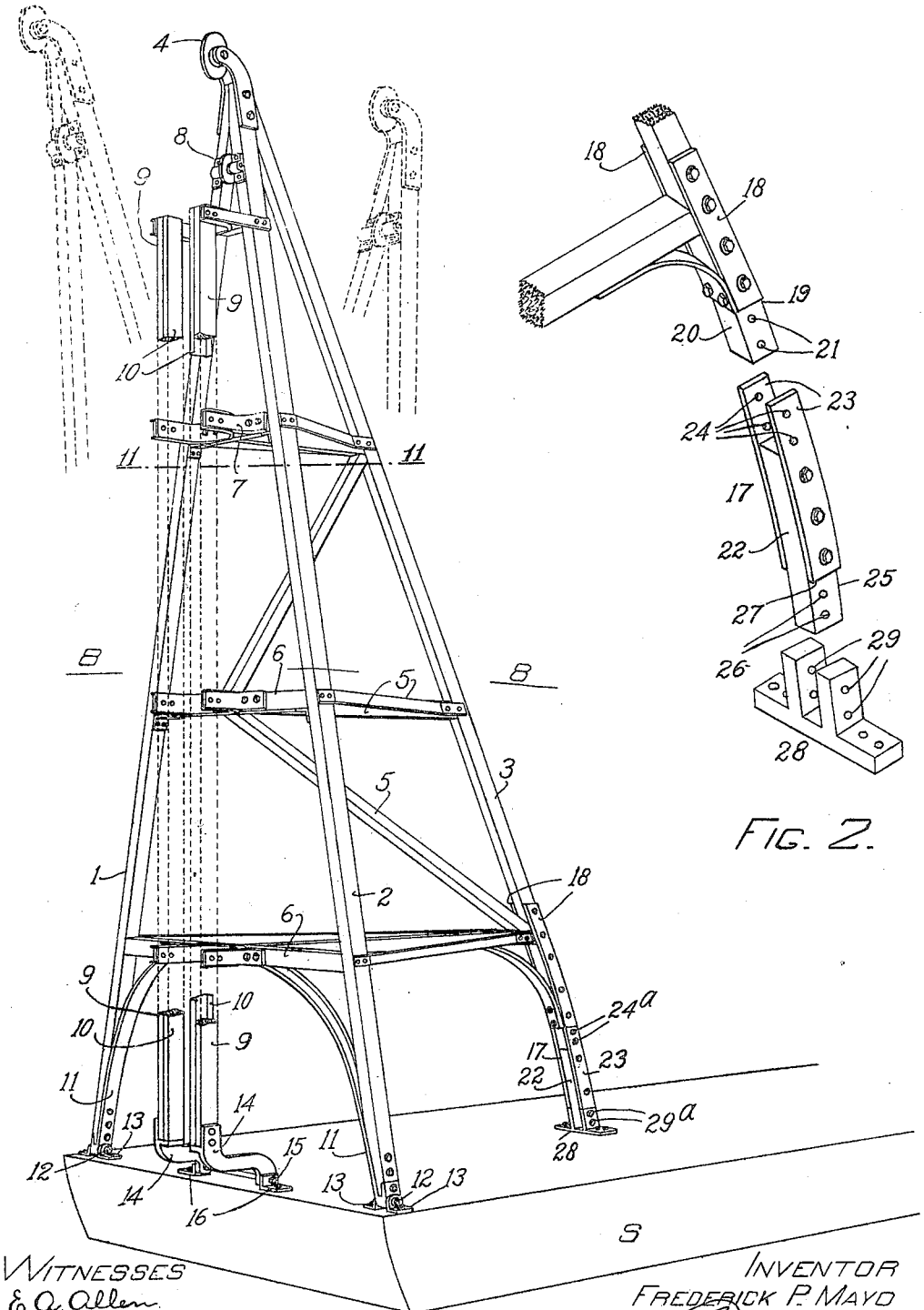

4 SHEETS—SHEET 2.

WITNESSES
E. O. Allen
Thomas E. Rothwell

INVENTOR
FREDERICK P. MAYO
BY
Everard S. Beach
ATTY.

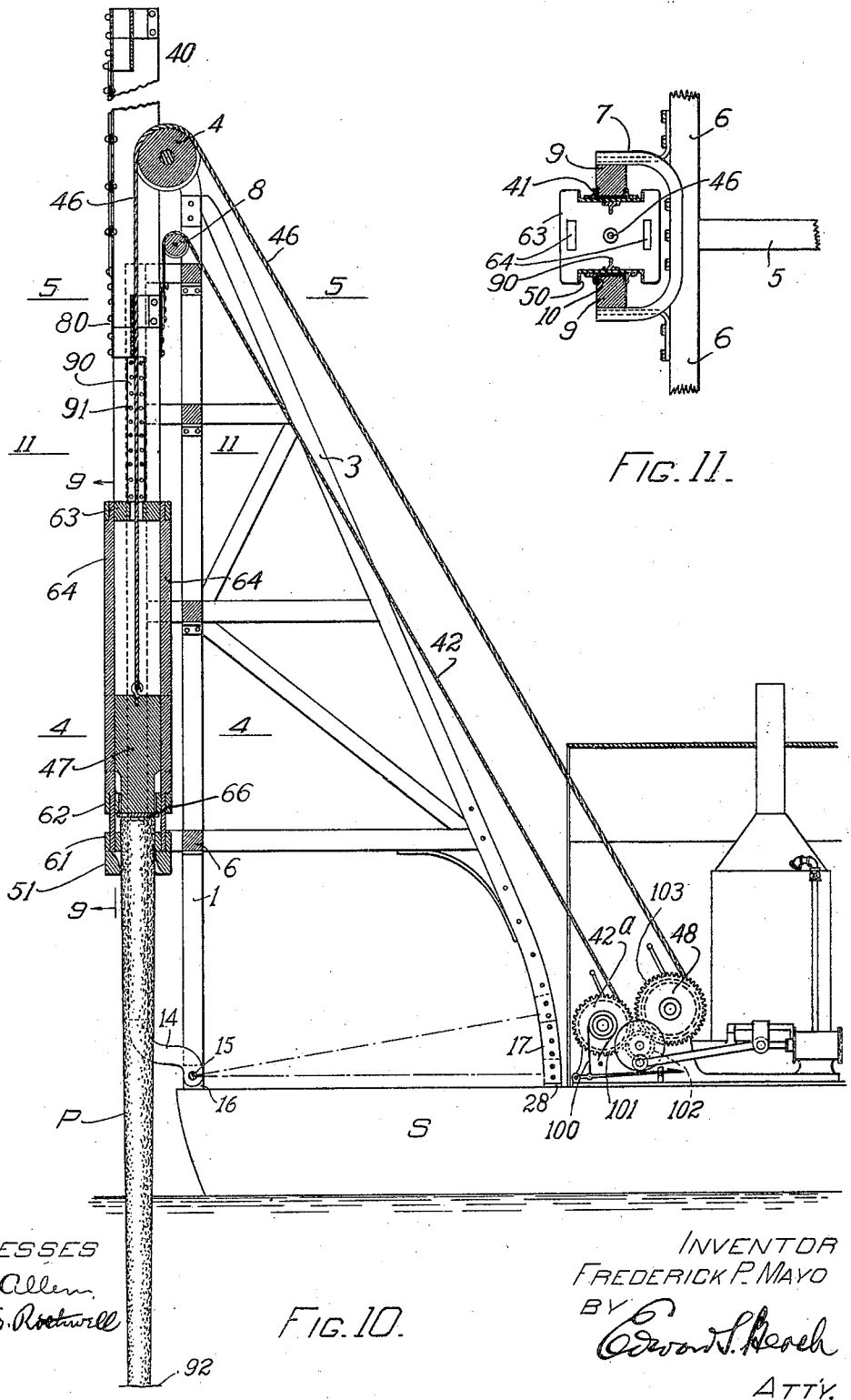

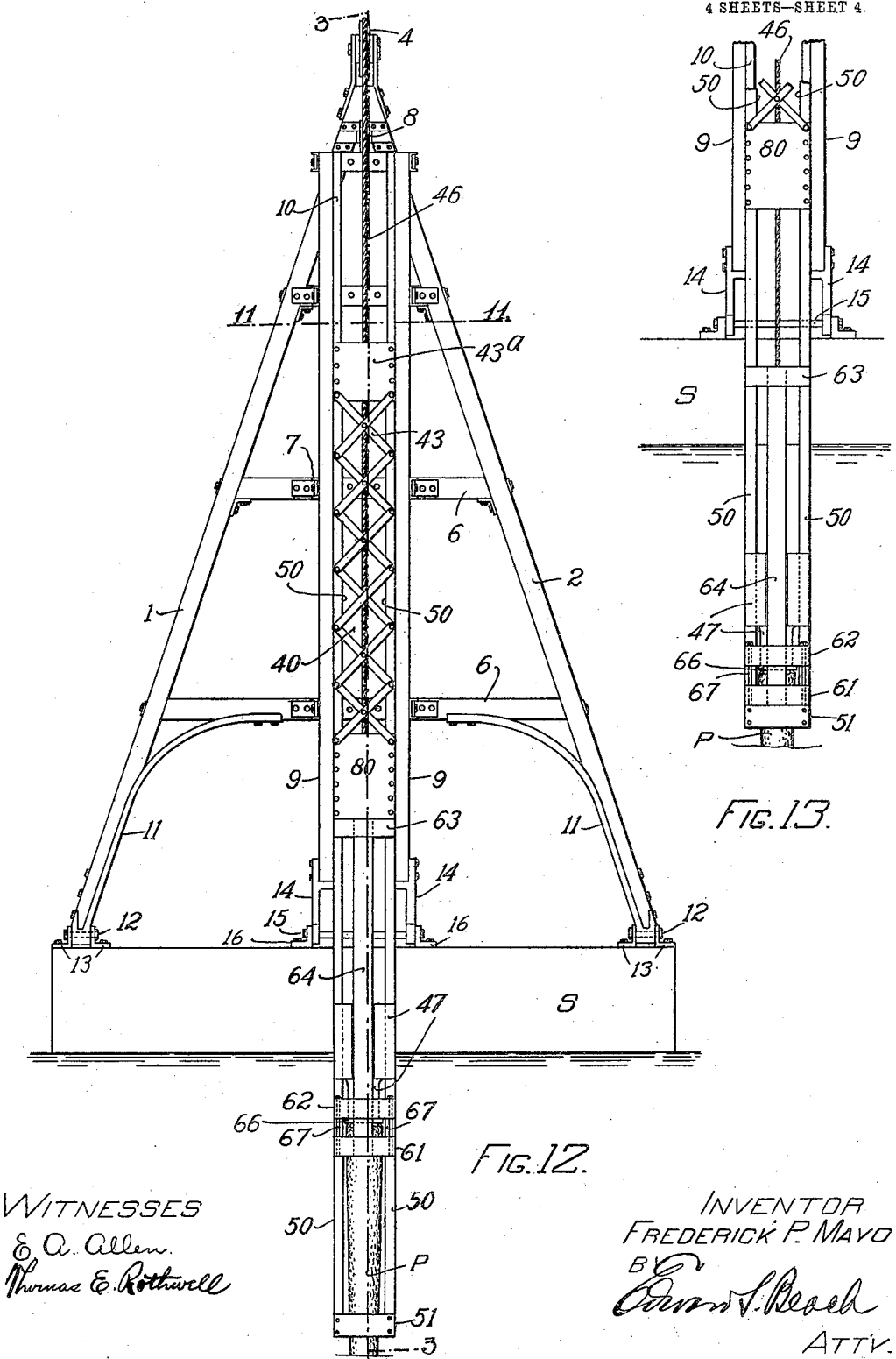

UNITED STATES PATENT OFFICE.

FREDERICK P. MAYO, OF BOSTON, MASSACHUSETTS.

PILE-DRIVER.

No. 822,620.  Specification of Letters Patent.  Patented June 5, 1906.

Application filed April 18, 1904. Serial No. 203,586.

*To all whom it may concern:*

Be it known that I, FREDERICK P. MAYO, a citizen of the United States, residing at Boston, in the county of Suffolk and State of Massachusetts, have invented certain new and useful Improvements in Pile-Drivers, of which the following is a specification, reference being had therein to the accompanying drawings.

Figure 4:
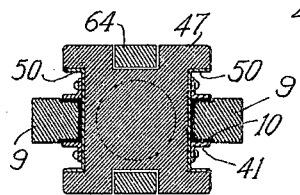
Figure 5:
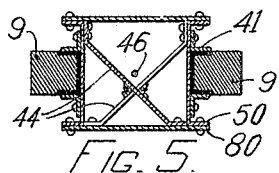
Figure 6:
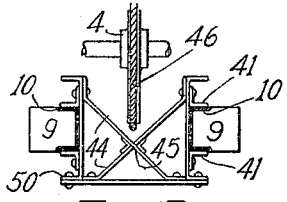
Figure 7:
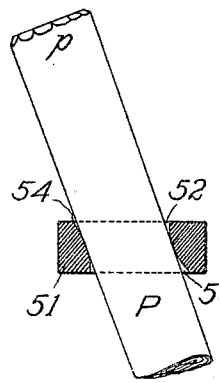
Figure 3:
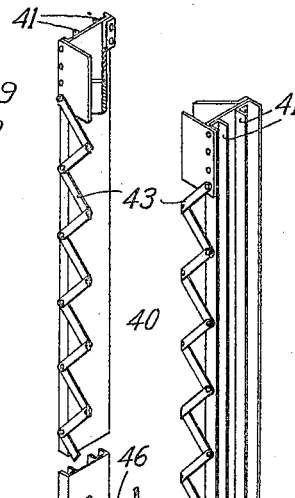
Figure 8:
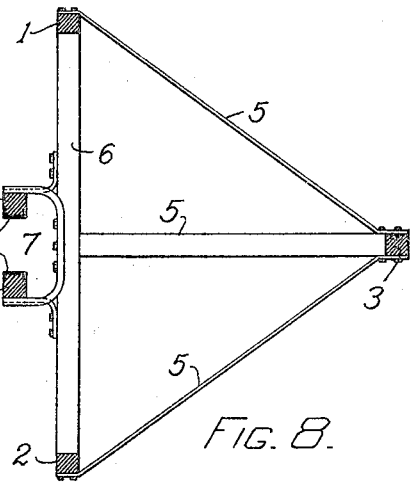
Figure 9:
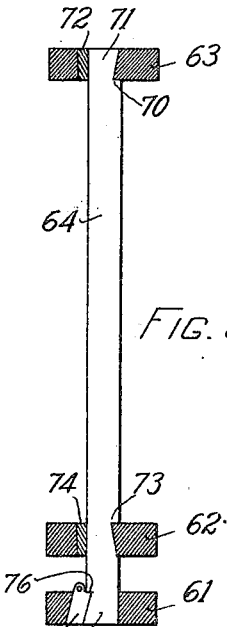

Figure 1 is a perspective view showing my new tiltable pile-driver frame mounted on a base, which is shown as a scow, the dotted lines indicating different positions of the frame when it is tilted either forward or back away from the vertical position shown in full lines. Fig. 2 is a perspective view of the hind leg of the frame and of its removable foot, by use of which the frame is kept vertical and by removal of which the frame is allowed to tilt backwardly. Fig. 3 is a perspective view of the endwise-reciprocating parts (hammer-guide, hammer, and pile-head frame) of pile-driving mechanism that is to be mounted on the endwise-stationary gins of the frame shown in Fig. 1. In this view, Fig. 3, said mechanism is sectioned vertically, the left and right hand portions of the view being complementary. The line of section is indicated by 3 3 on Fig. 12. This figure also shows in dotted lines a pile in position for driving and held in its initial driving position by a dog. Figs. 4 and 5 are plan views, partly in section, at a line corresponding to line 4 4 of Fig. 10 looking down. Fig. 6 is a top plan view showing the relation of the hammer-guide wheel to the interior braces of the endwise movable hammer-guide. Fig. 7 is a view, partly in section, showing a pile slantingly inserted through the pile-guide of the hammer-guide. Fig. 8 is a transverse view, partly in section, at line 8 8 of Fig. 1 and shows the constructional features of the tiltable pile-driver frame. Fig. 9 is a view, partly in section, at a line corresponding to line 9 9 of Fig. 10 and shows one means of detachably connecting the connecting-bars of three horizontal plates which, with the bars, constitutes a frame endwise movable on the hammer-guide. Fig. 10 is a central vertical section of the pile-driving mechanism complete on a base and shows the pile in driving position, the upper portion of the pile being above the base and the lower portion thereof below the base—for example, in water or a gulley. This view also shows winding-drums for the hammer-rope and for the hammer-guide rope and means for operating the drums. Fig. 11 is a transverse horizontal view, partly in section, at a line corresponding to line 11 11 of Fig. 10 and shows in plan the upper end of the frame. Fig 12 is a front plan view of the pile-driver, the head of the pile being below the pile-driver base—for example, in the water or in a gulley. Fig. 13 is a partially-front elevation of the pile-driver and shows the position of the hammer, hammer-guide, frame, and pile-head at the end of the driving operation.

In the drawings, 1, 2, and 3 are the legs of my new tiltable pile-driver frame. They are secured together at their upper ends and then provided with a grooved wheel for the pile-hammer rope. The legs, which may be of any number suitable in a tiltable frame, are firmly connected by suitable transverse braces 5. The front legs 1 and 2 are united by braces 6, on which outwardly-projecting U-shaped brackets 7 are secured midway between the front legs and with their recesses in line with but extending forward of the wheel 4. A grooved wheel 8 for the hammer-guide rope is also mounted midway between the front legs of the frame in line with and below the wheel 4. On the inner faces of the U-brackets 7 vertical parallel endwise-stationary leaders or gins 9 are secured, their inner faces being preferably shod with metal strips 10. The lower ends of the front legs 1 and 2 and of the vertical gins are suitably hinged to the base which supports the frame, the base being shown as a scow S. In the present construction the lower ends of the front legs are bolted in socket-irons 11, which in turn are pivoted at 12 to ears 13, fast on the scow. The lower ends of the vertical gins are also bolted in socket-irons 14, which are pivoted at 15 to ears 16, fast on the scow. The pivotal connections 12 and 15 are in the same horizontal line, and the frame, with its stationary gins fixed in place, may be tilted on these pivots forward and back of the vertical position, as indicated in dotted lines in Fig. 1. To permit this tilting of the frame and of the endwise-stationary gins, the hind leg 3 is made with a removable foot 17 17, and each frame may be provided with a plurality of these removable feet of different lengths. The lower end portion of leg 3 in the present form of construction is provided with a pair of side plates 18, the lower ends of which form shoulders 19 above the lower extremity of the leg, a portion 20 of which projects below the shoulders 19 and has transverse bolt-holes 21. The foot 17 in its present construction is made up of a block 22 and a pair of side plates 23, the upper ends of the plates extending above the upper end of the block and being formed with transverse bolt-holes 24. The leg portion 20 is received between the plates 23, the shoulders 19 bearing on the upper ends of the plates 23. Bolts 24<sup>a</sup> through the bolt-holes 21 and 24, which are coincident when the foot 17 is in place, securely unite the foot to the leg 3. The lower end portion 25 of block 22 has transverse bolt-holes 26 below the lower ends of plates 23. The lower ends form shoulders 27. On the scow or base for reception of the lower end of removable foot 17, a U-shaped bracket 28 is fixed, the arms of the bracket having transverse bolt-holes 29. Lower end portion 25 of the block fits between the arms of bracket 28, the shoulders 27 resting on the upper ends of the bracket-arms when the foot is in place and the lower end of the foot being held in the bracket by bolts 29<sup>a</sup> through the then coincident bolt-holes 26 and 29. By removing the foot 17 the lower end of the leg may be locked in the bracket 28 and the frame be held with its top back of the vertical. By substituting for a foot 17 of a length suitable for holding the frame in its vertical position a foot longer than that the frame may be held with its top forward of the vertical. I may provide for each frame, when desired, a number of these removable feet, some of which are longer than and some of which are shorter than the foot requisite to hold the frame vertically, and consequently provide the users with means for holding the pile-driving frame not only in vertical, but also in positions forwardly and backwardly inclined from the vertical. The purpose of tilting the pile-driver frame and gins either side of the vertical is for "front batter" and "back batter," as may be required—that is, to adjust the gins so that the piles may be driven on an incline with their tops toward the foot of the pile-driver frame (front batter) or on an incline with their lower ends slanting toward or under the pile-driver frame, (back batter.) Heretofore piles have been front-battered and back-battered only with great inconvenience and undue expense, and my present apparatus is the first known to me for accomplishing that purpose by any kind of mechanism specially devised for the purpose. It will be observed that while the tilting of the pile-driver frame is a simple, strong, and readily-managed contrivance for effecting front batter and back batter, yet it (the tiltable frame) is only a means of tilting the endwise-stationary gins one way or the other from the vertical. The essential point is to incline the gins so that they may guide the pile-driving mechanism on incline when it is desired to front batter or back batter. No one, so far as I know, has hitherto made a pile-driving apparatus in which there was any mechanical provision for working the pile-driving mechanism on an incline.

My invention also involves improvements whereby a pile may be driven by the hammer in cuts or gulleys below the base of the frame or in water under the scows. In driving piles as very commonly practiced the tops of the piles are left above grade or above the earth into which they are driven, the projecting portions being sawed off, so that considerable timber is wasted. An object of my invention is to drive piles with their tops substantially flush with river-bottoms and sea-bottoms or with their tops at desired heights above the ground that is under water. While apparatus for driving the upper ends of the pile below the faces of the driver, and consequently saving the waste of pile without the use of a follower interposed between the pile and hammer, is old, yet no such apparatus, so far as I know, has ever been in use; but my invention relates to this old class of pile-driving apparatus and not to that variety of pile-driving apparatus in which a follower is interposed between a steam-hammer and the pile. The use of followers is objectionable, because the piles are frequently driven crooked and also because the followers are long and heavy, and followers of different lengths have to be frequently substituted in the pile-driving machine.

In that class of pile-driving machines in which a steam-hammer is used to strike blows upon a follower which rests on the upper end of the pile to be driven great practical objection is made because the steam-hammer cannot be operated below the surface of the water, and yet it is practically important to have the hammer proper strike the head of the pile to be driven until the pile is completely driven. In my invention the hammer may operate below water and clear down to the surface of the ground under water, no follower being used.

Referring to my pile-driving mechanism, 40 is an endwise-movable hammer-guide formed on two opposite outer sides with ways 41, within which the gins 9 are received. Hammer-guide 40 is endwise movable on and between the gins, being directly supported by the hammer-guide rope 42, one end of which is secured to the upper end of the hammer-guide and the other end of which is secured to the winding-drum 42<sup>a</sup>. Hammer-guide 40 is preferably made of angle-iron exteriorly braced by the lattice-braces 43 and interiorly braced by the diagonal braces 44, the intersections of which at 45 are forward of both projecting wheels 4 and 8 on the pile-driving frame, so that the hammer-guide may reciprocate past the wheels 4 and 8 and at the same time permit the hammer-rope 46 over wheel 4, between wheel 4 and hammer 47, to stand in the longitudinal axis of the hammer-guide. The hammer-rope 46 extends from hammer 47, over wheel 4, to winding-drum 48, the hammer being provided with lengthwise-extending recesses, as at 49, on two opposite sides which receive the side frames 50 of the hammer-guide, said ways 41 being on the outer surfaces of the side frames 50. Thus the hammer-guide frame 40 serves to guide the hammer during its reciprocation in driving a pile. It is obvious that the hammer-guide may be raised by taking up the hammer-guide rope 42 and allowing it to fall toward and on the pile by slackening hammer-guide rope 42.

As my invention contemplates the elimination of followers and of steam-hammers used in connection with followers and the direct blow of the hammer on the pile when the pile is to be driven under water or below the base of the pile-driver, it becomes necessary to use some suitable and efficient pile-holder. When a pile to be driven into the ground under water is put overboard, its lower under portion is strongly buoyed up, owing to its tendency to float, and practically piles when so handled are manipulated from their upper end portions only. Consequently I provide at the lower end of the hammer-guide a pile-guide 51, which is a stout horizontal plate fast on and between the lower extremities of the frame-pieces 50. This pile-guide has a central recess 52, the walls of which at 53 and 54 are preferably slanted, so that the bottom end of pile 50 may be readily inserted on a slant through the opening 52, the walls 53 and 54 preferably slanting downwardly and inwardly from the upper side of the pile-guide. When the hammer-guide frame is drawn up on the gins, so that the lower end of the hammer-guide—that is, the pile-guide 51—is near the surface of the water, the attendants may readily direct the bottom end of the pile through the opening in the pile-guide, and as they push the pile-guide downwardly through the water the pile-guide will keep the pile within their control until its upper end $p$ is in position to be brought into and through the central opening 60 of the pile-holding plate 61, which with the pile-arrester plate 62 and hammer-stop plate 63 are connected together by vertical bars 64, so that the pile-holding plate 61, the pile-arrester plate 62, and the hammer-stop plate 63, together with the connecting-bars 64, form a pile-head frame which is endwise movable on the frame-pieces 50. The sides of plates 61, 62, and 63 opposed to the two frame-pieces 50 are recessed, as at 65, to receive side frames 50 and slide thereon. Hammer 47 reciprocates between the under side of the plate 63 (through plate 62) and the upper side of plate 61. Plate 62 has a central recess to permit the lower end of the hammer to pass through it.

Between the pile-holding plate 61 and the pile-arrester plate 62 there is mounted a freely-moving disk 66, of steel or the like, of a diameter larger than that of the hole through the plate 62 and also of a diameter greater than the diameter of the hole 60. The plates 61 and 62 are held apart by bolts 67. In driving piles it has long been customary to band their heads to prevent splintering by the impact of the hammer. The bands and the cost of applying the bands are both a source of expense. When the pile tops, as heretofore, have been sawed off, many of the bands have been lost, and generally the bands have been left on the driven piles. To avoid this expense and at the same time to protect the tops of the piles from being splintered by the blows of the hammer, I use the freely-moving disk 66, which during the driving of the pile rests on the pile top and directly receives the impact of the hammer. It will be seen that when the pile is slipped into place through the pile-guide 51 and the hole in the pile-holding plate 61 the disk 66 will rest on the pile-top and that while the pile is being driven the weight of the pile-head frame (formed by the plates 61, 62, and 63 and the connecting-bars 64) will rest on the upper end of the pile, the plate being then between the upper end of the pile and the under side of the plate 62. The weight of this pile-head frame is very considerable. The weight of this frame tends to force the pile downwardly independently of the hammer-blows, and by holding the pile laterally at two points, one practically at its head within the plate 61 and the other a few feet below within the pile-guide 51, the pile is kept straight in line with the hammer, it being impossible in that case for the water around the pile below the pile-holding plate to float the pile into a position deflected from the line of the longitudinal axis of the hammer. A dog 68, attached to a chain 69, which is secured conveniently to the plate 61, is driven into the pile below the plate 61 when the pile is in place and aids in holding the pile in the holes 60 and 52, while the hammer-guide frame and the pile-head frame formed by the plates 61, 62, and 63 and connecting-bars 64 are raised to the position shown in Fig. 3. By the first blow of the hammer the dog is freed from the pile, the point of the pile being then in the ground, the descent of the pile under impact of the hammer carrying the pile away from the dog.

The disk 66 must be frequently replaced, and for convenience in removing the worn plates and replacing them with new ones the upper ends of the connecting-bars 64 are each formed with an acute-angled side notch 70, forming a shoulder against which the under surface of the plate 63 rests, the plate 63 being formed with a slot having oppositely-inclined end walls and long enough to take the end portions 71 of the connecting-bars 64 and also a key 72 for each end 71. The connecting-bars also have a similar side notch where they pass through the plate 62, the upper side of the plate 62 bearing against the shoulders 73 one on each bar 64 and the plates 62 being provided with slots through which the side bars pass and of a length sufficient to receive each a key 74. The plate 61 is also provided with a slot to receive the lower ends 75 of the connecting-bars 64, the bars having each a side shoulder 76. Each slot in plate 61, within which the lower end 75 of a connecting-bar 64 is mounted, is long enough to receive not only an end 75, but also a key 77. By driving out the keys 72, 74, and 77 the plates 61 62 63 and connecting-bars 64 may be readily separated when desired. All these parts may be separated for putting in a new hammer or making repairs thereto. For removal and replacement of the worn disks 66 it is necessary only to loosen the keys 77 and to remove the plate 61. The lower edge of the lowest of the transverse plates 80, which unite and serve to brace the frame-pieces 50, arrest the pile-head frame when it is raised to its highest position, as shown in Figs. 3 and 12. Plate 63 has a central aperture for the passage therethrough of the hammer-rope 46.

In driving land-piles the piles are supported with their points in the ground, the whole weight of the hammer-guide and of the pile-head frame being on the pile which is not inserted from above through the pile-guide 51. Generally when driving land-piles the removable shims 90 are used, (see Fig. 10,) the lower ends of the shims forming abutments, which bring up on the top of the pile-head frame when the hammer-guide descends, and thus throws the whole weight of the hammer-guide and pile-head frame on the pile. In this way the lower end parts of the pile-head frame are kept close to the pile-guide 51, as is desirable.

For driving piles in water the shims may be removed in order to draw the upper end portion of a pile well up within the hammer-guide. The hammer-guide descends (on the gins) as the pile is driven and may descend into the water. The pile-head frame descends (on the hammer-guide) as the pile is driven and may descend into the water. No "follower" is required in connection with the described apparatus for driving piles below water.

Shims 90 are held in place by bolts 91, so that the shims may be readily removed when desired. In Fig. 10 it will be observed that plate 63 is against the lower end of a shim 90, while the upper end portion of the pile is considerably above the water or above the base of the pile-driver frame. The lower end of the pile is supposed to be driven in the mud below 92, Fig. 10. It frequently happens that piles are to be driven in such situations that their lower end portions may be put into the ground before the driving begins without first slipping the lower end portion of the pile through the pile-guide 51. Such a condition is indicated in Fig. 10, and under this condition it is not necessary to lift the pile-head frame above its uppermost position—for example, the plate 80, Fig. 3. Under this condition, Fig. 10, hammer 47 in its reciprocation is between the arrester-plate 63 and the pile-disk 66. The advantage of this is that it renders it unnecessary to lower the pile through the pile-guide 51 in order to set it. If, for example, Fig. 10, the pile is to be driven with its upper portion standing fifteen feet out of water, then the shims are useful. On the other hand, for example, if a shorter pile is to be driven in deep water, with its head at or under grade, it is necessary to hold the pile at two points, as in Figs. 12 and 13, for example, in order to keep the pile from deflecting while lowering it into position; but if the piles are long enough to be set up above the surface of the water before the driving operation begins then it is only necessary that the heads should be confined, and this is done by bringing the plate 61 of the pile-guide 51 together and fastening them in that position by the shims 90. When pile-guide 51 gets to grade, fall 42 arrests the further descent of the hammer-guide frame 40, there being suitable sights placed on the hammer-guide frame and observed in the usual way from bench-marks to determine when the pile-guide frame is at grade. The hammer then pounds the pile until plate 61 is brought to plate 51. To accomplish this, the attendant stops the rotation of drum 42$^a$ by means of the brake 100. After drum 42$^a$ is stopped to prevent the unwinding of fall 42 drum 48 winds and unwinds to permit fall 46 to raise the hammer and then to slack and permit the hammer to drop. Drum 42$^a$ is provided with a gear 101, meshing with a pinion 102, which in turn meshes with the gear 103 of drum 48.

What I claim is—

1. In a pile-driver, the combination of a base for a pile-driver; a tiltable pile-driver frame hinged on the base; and a removable foot for holding the frame in working position.

2. In a pile-driver, the combination of a base for a pile-driver; a tiltable pile-driver frame hinged on the base; means for locking it in working position; endwise-stationary, upright gins on the front of the frame; an endwise-slidable hammer-guide on the gins; an endwise-slidable pile-head frame on the endwise-slidable hammer-guide; a hammer; means for operating the hammer; and means for raising and lowering the pile-head frame on the hammer-guide.

3. In a pile-driver, the combination of stationary, upright gins; a slidable hammer-guide on the gins; a hammer; and hammer-actuating mechanism; the upper portion of the hammer-guide being movable into a position above, and the lower portion being movable into a position below, the gins.

4. In a pile-driver, the combination of stationary, upright gins; a hammer-guide slidable on the gins and having a pile-guide at its lower end; and a hammer.

5. In a pile-driver, the combination of upright gins; a hammer-guide slidable on the gins; a hammer; a pile-guide at the lower end of said hammer-guide; a pile-head frame slidable on the hammer-guide and carried thereby; a pile-arrester plate having a hole through it for passage of the hammer; a disk below the pile-arrester plate; and an apertured, pile-holding plate below the disk.

6. In a pile-driver, the combination of stationary gins; a hammer-guide movable thereon; a hammer; means for operating the hammer; a pile-head frame slidable on the hammer-guide; a pile-guide at the lower end of the hammer-guide; means for holding the pile within the pile-head frame, for impact of the hammer; the pile-head frame resting on the pile when the pile is in place; means for raising the pile-head frame on the hammer-guide; and means for arresting the upward movement of the pile-head frame on the hammer-guide.

7. In a pile-driver, the combination of stationary gins; a hammer-guide slidable on the gins; a hammer; the hammer-guide having means for holding the pile below its head; and, thereabove, other means for holding the pile at or near its head.

8. In a pile-driver, the combination of stationary gins; a hammer-guide slidable on the gins; a hammer; a pile-head frame slidable on the hammer-guide, and removable shims which hold the hammer-guide and pile-head frame in fixed relation, when required.

9. In a pile-driver, the combination of stationary gins; a hammer-guide slidable on the gins; a pile-head frame slidable on the hammer-guide; a hammer-rope; a winding-drum therefor; a pile-head-frame rope; a winding-drum therefor; and means for connecting and disconnecting said drums.

10. The combination of gins; a hammer-guide slidable endwise on the gins; a hammer; means for raising it; a pile-head frame slidable on the hammer-guide and comprising a dog; and a pile-guide near the lower end of the hammer-guide.

In testimony whereof I affix my signature in presence of two witnesses.

FREDERICK P. MAYO.

Witnesses:
EDWARD S. BEACH,
E. A. ALLEN.